C. V. LOGWOOD.
SYSTEM FOR TRANSMITTING COMMUNICATIONS.
APPLICATION FILED JAN. 22, 1916.
1,218,195.
Patented Mar. 6, 1917.
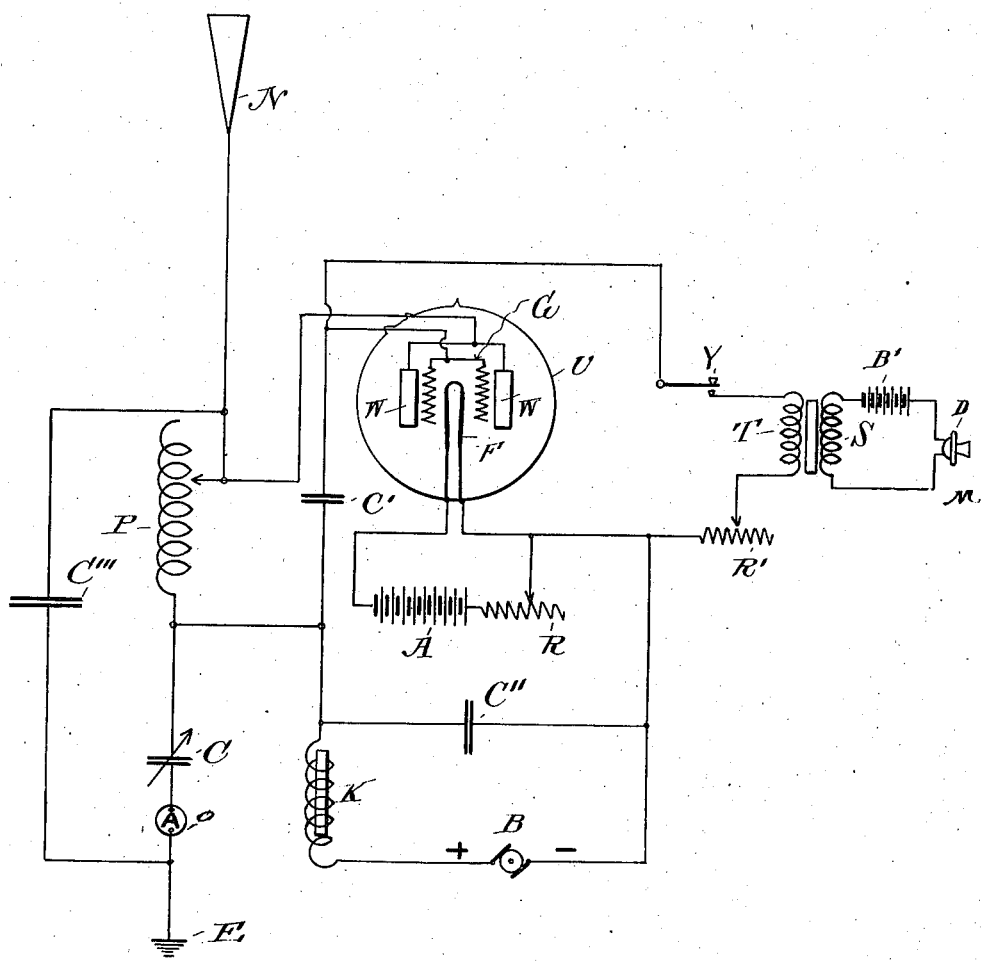
Charles V. Logwood, Inventor
By his Attorney
Samuel E. Darby

UNITED STATES PATENT OFFICE.

CHARLES V. LOGWOOD, OF NEW YORK, N. Y., ASSIGNOR TO DE FOREST RADIO TELEPHONE AND TELEGRAPH COMPANY, OF NEW YORK, N. Y., A CORPORATION OF DELAWARE.

SYSTEM FOR TRANSMITTING COMMUNICATIONS.

1,218,195.  Specification of Letters Patent.  Patented Mar. 6, 1917.

Application filed January 22, 1916. Serial No. 73,641.

*To all whom it may concern:*

Be it known that I, CHARLES V. LOGWOOD, a citizen of the United States, residing at New York, in the county of Bronx, State of New York, have made a certain new and useful Invention in Systems for Transmitting Communications, of which the following is a specification.

This invention relates to transmitting systems.

The object of the invention is to provide a transmitting system which is simple and efficient.

A further object is to provide a method and circuits for producing, radiating or transmitting and controlling in accordance with signals to be sent, high frequency continuous oscillating electrical waves.

Further objects of the invention will appear more fully hereinafter.

The invention consists substantially in the circuit arrangement for accomplishing the purposes thereof, as shown in the accompanying drawing, and finally pointed out in the appended claims.

Referring to the drawing, the single view thereon shows one circuit arrangement for accomplishing the purposes of my invention, where U designates an evacuated vessel of the three electrode type, containing the filament electrode F, and the wing and grid electrodes W, G, in this instance shown in sets of two connected in parallel, the grid electrodes being intermediate the wing, forming an oscillator of the well known type of oscillating audion known as the "oscillion." The filament electrode F is heated from the current source A through the controlling resistance R.

The grid and plate electrodes are connected to the respective treminals of an inductance P which is preferably made adjustable, as shown, but between the grid electrodes and the inductance P is connected a stopping condenser C'. The wing or plate electrodes W are connected through the inductance P and choke or impedance coil K, with the positive terminal of current source B, preferably a direct current dynamo of from 500 to 1500 volts, as shown. The negative terminal of the source B is connected to one leg of the filament electrode F, and a condenser C'', of relatively large capacity is connected across the terminals of the source B and the choke or impedance coil K, all as clearly shown. The grid electrodes G are connected to one leg of the filament electrode F through a coil T, and very high resistance R', thereby forming a high resistance leak path between these two electrodes.

When thus connected, I find that the system becomes a very energetic and efficient generator of electrical oscillations through the coil P and stopping condenser C', the period of which depends largely upon the amount of inductance and capacity thereof, and also, to some degree, upon the amount of resistance in the grid-filament leak path, the temperature of the filament, etc., as is well understood.

When the leak path is completely broken as by a Morse key Y, or other suitable switch, the system ceases to generate electrical oscillations. It is easy, therefore, to control the generation and radiation of the system by the manipulation of the Morse key or switch Y in the leak path.

Similarly, the energy taken by the oscillion from the source B and transformed into alternating current energy, is largely dependent upon the magnitude and polarity of the electric potentials resident at any instant on the grid electrodes. Consequently, if in the leak path from the grid electrode G, be connected a secondary coil T, of a high tension, audion-frequency transformer, and if the primary winding S thereof be connected to a microphone M through a battery B', in the usual manner, potentials are impressed between the grid and the filament electrodes of the oscillion in accordance with sound waves which are caused to impinge against the diaphragm D of the microphone. Thus the amplitudes of the alternating currents set up in the wing grid circuit of the oscillion through the coil P are caused to vary through wide limits in perfect accord with the amplitudes of the sound waves in the microphone. Thus the system becomes, when the switch K is maintained closed, a very efficient radio telephone transmitter.

I find that when an antenna and earth connection are made to the two terminals of the coil P in the wing grid circuit as shown at N and E, respectively there is but one oscillating circuit, that constituted by the antenna earth capacity, indicated in dotted lines at C''', shunted around the inductance P. If desired, and as shown, an additional capacity as condenser C may be inserted in the antenna-earth circuit, but this condenser, I find, is not necessary. In this system, therefore, the current of the antenna is independent of any tuning of two circuits, as is shown by the hot wire ammeter O connected in the antenna earth circuit, which, I have found, varies but little as the inductance P or the capacity C is varied, the small variations indicated in the ammeter O being due entirely to the changes in the antenna radiation resistance as the wave length of the single oscillating circuit P, C, C''' is varied.

It will be seen, therefore, that I provide a transmitting system employing but a single oscillating circuit, which is characterized by an efficiency of radiation independent of the tuning of the oscillating circuit.

It will also be seen that I have provided a transmitting system wherein the oscillating circuit associated with the source of oscillating current is at the same time the radiation circuit of the system, thereby greatly reducing the amount of apparatus and circuits needed for transmitting purposes, and at the same time secures more efficient, and quicker service.

Having now set forth the objects and nature of my invention, and having shown and described one embodiment thereof, what I claim as new and useful and of my own invention, and desire to secure by Letters Patent, is,—

1. Means for generating and transmitting electrical oscillations comprising an evacuated vessel containing two cold electrodes and a hot electrode, said cold electrodes being located at relatively different distances from said hot electrode, an inductance connected between said cold electrodes, and an electromagnetic wave radiating member conductively connected directly to one of said electrodes.

2. Means for generating and transmitting electrical oscillations comprising an evacuated vessel containing wing and grid and filament electrodes, an inductance connected between said wing and grid electrodes, and a radiating member conductively connected directly to said wing electrodes.

3. Means for generating and transmitting electrical oscillations comprising an evacuated vessel containing two cold electrodes and a hot electrode, said cold electrodes being located at relatively different distances from said hot electrode, an inductance connected between said cold electrodes, and an electromagnetic wave radiating member conductively connected directly to one of said electrodes, and a capacity connected to the other of said electrodes through a condenser.

4. Means for generating and transmitting electrical oscillations comprising an evacuated vessel containing wing and grid and filament electrodes, an inductance connected between said wing and grid electrodes, and a radiating member conductively connected directly to said wing electrodes, and a capacity connected to said grid electrode through a condenser.

5. Means for generating and transmitting electrical oscillations comprising an evacuated vessel containing a hot and two cold electrodes, said cold electrodes being located at relatively different distances from said hot electrode, an inductance, connected between said cold electrodes, a radiating member conductively connected directly to one of said cold electrodes, a leak path connecting the other of said cold electrodes with said hot electrode.

6. Means for generating and transmitting electrical oscillations comprising an evacuated vessel containing a filament, a grid and a wing electrode, an inductance connected between said wing and grid electrodes, a radiating member connected to said wing electrode and a high resistance leak path connecting said grid electrode with said filament electrode.

7. Means for generating and transmitting electrical oscillations comprising an evacuated vessel containing a filament, a grid and a wing electrode, an inductance connected between said wing and grid electrodes, a radiating member connected to said wing electrode and a high resistance leak path connecting said grid electrode with said filament electrode and means for breaking the circuit of said leak path.

8. Means for generating and transmitting electrical oscillations comprising an evacuated vessel containing a hot and two cold electrodes, said cold electrodes being located at relatively different distances from said hot electrode, an inductance, connected between said cold electrodes, a radiating member connected to one of said cold electrodes, a leak path connecting the other of said cold electrodes with said hot electrode and means for breaking the circuit of said leak path.

9. Means for generating and transmitting electrical oscillations comprising an evacuated vessel containing a hot and two cold electrodes, said cold electrodes being located at relatively different distances from said hot electrode, an inductance, connected between said cold electrodes, a radiating member conductively connected directly to one of said cold electrodes, a leak path connecting the other of said cold electrodes with said hot electrode and means included in said leak path for varying the potential impressed on the cold electrode thereof in accordance with the amplitudes of sound waves.

10. Means for generating and transmitting electrical oscillations comprising an evacuated vessel containing a filament, a grid and a wing electrode, an inductance connected between said wing and grid electrodes, a radiating member connected to said wing electrode and a high resistance leak path connecting said grid electrode and said filament electrode and means included in said leak path for varying the potential impressed on said grid electrode in accordance with the amplitudes of sound waves.

11. Means for generating and transmitting generated oscillations comprising an evacuated vessel containing hot and cold electrodes, said cold electrodes being located at relatively different distances from said hot electrode, and a single oscillating circuit comprising the radiating circuit directly connecting two of said electrodes.

In testimony whereof I have hereunto set my hand on this 17th day of January, A. D., 1916.

CHARLES V. LOGWOOD.